May 22, 1956

B. W. RUNION 2,746,423

FEEDING STATION FOR SMALL STOCK

Filed Aug. 28, 1953

INVENTOR.
Boyce W. Runion,
BY Victor J. Evans & Co.
ATTORNEYS

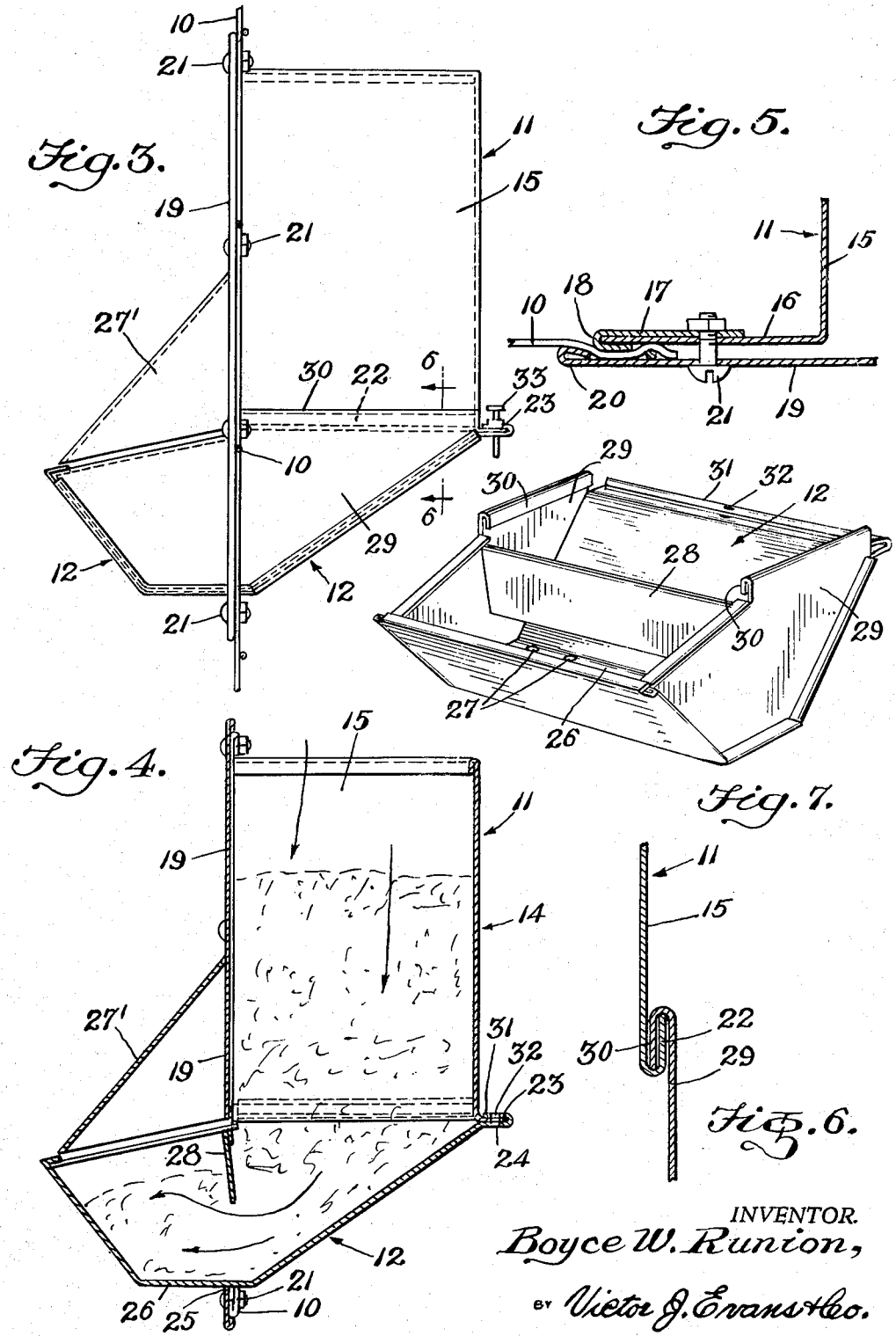

United States Patent Office 2,746,423
Patented May 22, 1956

2,746,423

FEEDING STATION FOR SMALL STOCK

Boyce W. Runion, Portland, Oreg.

Application August 28, 1953, Serial No. 377,111

3 Claims. (Cl. 119—52)

This invention relates to a feeding device, and more particularly to a device for use in feeding stock or animals, such as rabbits.

The object of the invention is to provide a feeding device which can be readily attached to a fence or side wall of an enclosure, whereby rabbits, foxes, poultry or other stock can be kept in an enclosure and supplied with feed.

Another object of the invention is to provide a feeding device which includes a feed tray that is detachably connected to a hopper whereby the tray can be readily removed when it is to be cleaned, and sterilized.

A further object of the invention is to provide a feeding device which is extremely simple and inexpensive to manufacture.

Other objects and advantages will be apparent during the course of the following description.

In the accompanying drawings forming a part of this application, in which like numerals are used to designate like parts throughout the same:

Figure 3 is a side elevational view of the feeding device of the present invention;

Figure 4 is a sectional view taken on the line 4—4 of Figure 1;

Figure 5 is an enlarged sectional view taken on the line 5—5 of Figure 1;

Figure 6 is an enlarged sectional view taken on the line 6—6 of Figure 3.

Figure 7 is a perspective view of the tray detached from the assembly.

Figure 1:
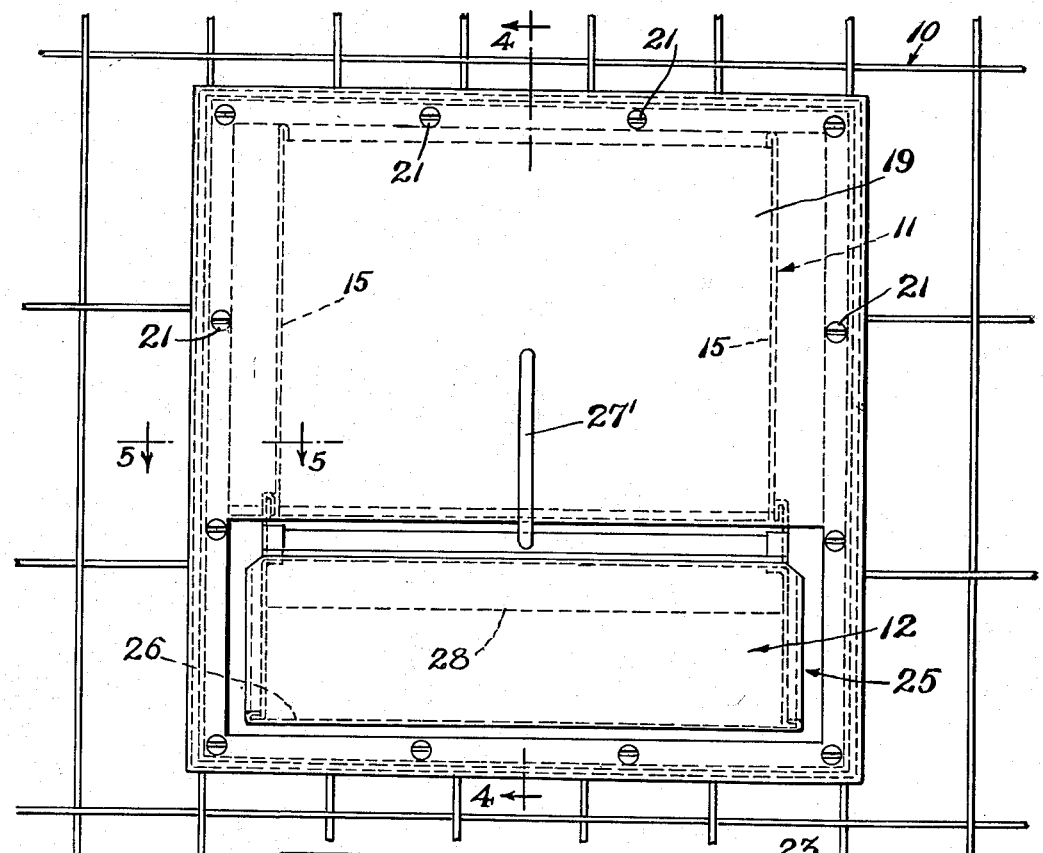
Figure 1 is a front elevational view of the feeding device of the present invention attached to a fence.

Referring in detail to the drawings, the numeral 10 designates a portion of a fence which may be fabricated of wire, and the fence 10 may be used to surround a plurality of livestock or animals, such as rabbits, foxes, mink, or poultry. The present invention is directed to a feeding device which is adapted to be attached to the fence 10, and although the feeding device is shown attached to a wire fence 10, it is to be understood that other means of enclosing the poultry or animals may be used, such as a board fence or the like.

The feeding device of the present invention includes a vertically disposed hopper 11 which is adapted to be supplied with suitable feed or grain by an attendant or other person maintaining the feeding device, and detachably supported by and connected to the hopper 11 is a feed tray 12. The tray 12 is arranged in communication with the bottom of the hopper 11, whereby feed or grain can pass from the hopper 11 down into the tray 12. It will be seen from Figure 3 that when the feeding device of the present invention is attached to the fence 10, the front portion of the tray 12 projects beyond the fence 10 and into the enclosure so that livestock or animals in the enclosure can readily gain access or eat the feed in the tray 12. Also, it will be seen from Figure 3 that the hopper 11 is arranged on the opposite side of the fence 10 so that the attendant can keep the feeding device filled with the proper amount of grain or feed without the necessity of entering the enclosure.

The hopper 11 includes a vertically disposed back wall 14, Figure 4, and arranged at right angles with respect to the back wall 14 is a pair of spaced, parallel, vertically disposed side walls 15. Each of the side walls 15 is shaped to define or terminate in a transverse, elongated flange 16, Figure 5, for a purpose to be later described. Secured to the back surfaces of the flanges 16, as by welding, is a rectangular frame 17. The frame 17 includes an inturned portion 18, Figure 5, which embraces the free edges of the flange 16.

Arranged on the opposite side of the fence 10 from the hopper 11 is a rectangular plate 19. In other words, the plate 19 is arranged within the closure that contains or holds the stock being fed, while the hopper 11 is arranged on the outside of the enclosure. The plate 19 has its outer edges turned inwardly, at at 20. The plate 19 thus coacts with the frame 17 and with the flanges 16 to provide a clamp, and a plurality of suitable securing elements, such as bolt-and-nut assemblies 21, project through registering apertures in the plate 19 and through the flanges 16 and frame 17 to maintain the hopper 11 detachably connected through the fence 10. It will be understood that a large opening or cutout is provided in the fence 10 for each of the feeding devices that are being used.

Figure 2:
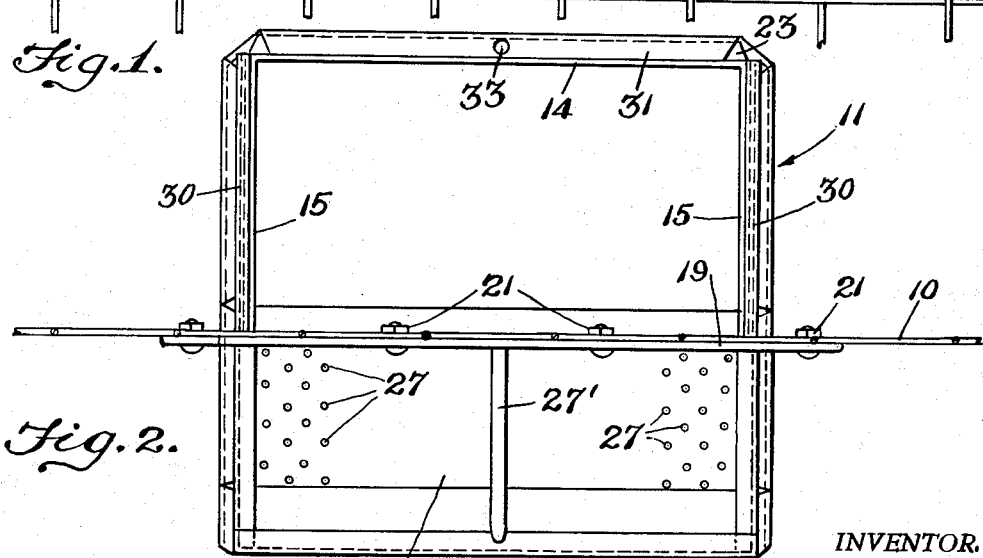
Figure 2 is a top plan view of the device of Figure 1.

The lower edges of the side walls 15 are turned upwardly to define guide lips 22, Figure 6, for a purpose to be later described. Also, the lower edge of the back wall 14 is shaped to define a horizontally disposed strip, Figure 4, and the strip is designated by the numeral 23. An aperture 24 is arranged in the strip 23 for the projection therethrough of a suitable securing element, such as a nail, whereby the tray 12 can be detachably locked to the hopper 11. The plate 19 is provided with a large rectangular cutout or opening 25 adjacent its lower portion, whereby the tray 12 can be readily projected therethrough, Figure 1. The feed tray 12 may be made of any suitable material and includes a bottom wall 26 which is provided with a plurality of spaced holes 27. The main purpose of the holes 27 is to permit feed dust and other accumulation to pass out of the tray. Also, water, such as rainwater will be able to drain through these holes 27, whereby the feed in the tray will not be harmed by excessive moisture. These holes are best seen in Figure 2. Projecting forwardly from the plate 19 is a triangularly-shaped partition 27′, the partition 27′ being secured to the plate 19 in any suitable manner, as for example by welding. By means of the partition 27′, small animals will be prevented from getting in the tray. Also, the partition 27′ will permit various animals such as rabbits to consume food in the tray 12 in such a manner that the animals will not interfere with each other so that fighting or friction between the animals will be minimized. Extending across the tray 12 is a bar 28, Figure 4, the bar 28 serving to control flow of feed so that the same will not overflow the tray. The bar 28 also serves to insure that none of the animals in the enclosure can escape from the enclosure out through the feeding device.

The tray 12 further includes spaced, parallel, vertically disposed side members 29, Figure 6, and the upper edges of the side members 29 are shaped to define or terminate in downwardly extending fingers 30. The fingers 30 slidably engage the lip 22 which are arranged on the bottoms of the side walls 15. Thus, the fingers 30 provide a support by which the tray 12 is supported by the hopper 11 and also the hopper 11 slidably supports the tray 12, whereby the tray 12 can be slid out of engagement with the hopper 11 when the tray 12 is to be cleaned. The rear portion of the bottom wall 26 of the tray 12 is shaped to define an elongated finger 31 which snugly receives therein the horizontally disposed strip 23. The finger 31 is provided with an aperture 32 that registers with the aperture 24 in the strip 23, and a suitable securing element, such as a nail 33, Figure 3, can be projected through the registering apertures whereby accidential rearward movement of the tray 12 is prevented.

From the foregoing it is apparent that a feeding device has been provided which is especially suitable for small stock, such as rabbits, foxes or poultry. The hopper 11 is detachably connected to the fence 10 by means of the plate 19 which coacts with the transverse flanges 16 and frame 17 to form a clamp, Figure 5. Thus, the bolt-and-nut assemblies 21 are then projected through the plate 19, through the flanges 16, and through the frame 17, and these bolt-and-nut assemblies 21 maintain the hopper 11 supported or connected to the fence 10. The upper end of the hopper 11 is open so that the attendant or the person feeding the stock can place feed or grain in the hopper 11 without the necessity of entering the enclosure. Also, the top of the tray 12 is open so that the feed will move in the direction indicated by the arrows, Figure 4, and this feed will work its way toward the front or left portion of the tray 12, Figure 4, so that the animals can readily consume the feed from the tray 12. The fingers 30 coact with the lips 22 to provide a support for the tray 12. Also, the construction of the fingers 30 and lips 22, Figure 6, is such that the tray can be slid or moved rearwardly when it is to be cleaned. When the tray is in its normal condition, the nail 33 may be projected through the registering apertures 24 and 32 so as to prevent accidential movement of the tray 12.

The feeding device of the present invention will insure that the food is maintained in a sanitary condition and also, the feeding device is attractive and ruggedly constructed. The feeding device may be made of any suitable material, such as sheet aluminum, galvanized iron, or plywood which may be painted. The outer edges of the frame are rolled so as to strengthen the frame, and the tray 12 may be easily removed so as to permit cleaning thereof, and sterilizing thereof.

The sliding feeder tray shown in Figure 7 can be easily removed, so that it can be cleaned and sterilized, and this is an important issue with rabbit breeders since their present feeding system makes no allowance for easy cleaning of feeders. Thus, when persons have several hundred rabbits to feed, this becomes a big item as there are from one to ten rabbits droppings in each feeder every day the rabbits feed. Also, sometimes the rabbit will urinate in the feeder and it becomes necessary to spend some time cleaning one feeder, whereas with the feeder tray system of the present invention there would be very little time wasted.

I claim:

1. In a feeding device, a feed-holding hopper adapted to be attached to a fence of an enclosure, said hopper being arranged exteriorly of the enclosure and including a vertically disposed back wall and vertically disposed spaced parallel side walls, said side walls terminating in a transverse flange, the bottom edges of said side walls defining guide lips, an elongated horizontally disposed strip projecting rearwardly from the bottom of said back wall and provided with an aperture, a rectangular frame connected to the flanges of said hopper and contiguous to the inner surface of said fence and detachably connected to said frame and flanges, there being a rectangular opening in the lower portion of said plate, and a tray having its upper end open for receiving feed from said hopper, said tray including spaced parallel vertically disposed side members provided with downturned fingers for slidably engaging the lips on said hopper, a portion of said tray projecting through the opening in said plate whereby animals can gain access to the feed therein, and a finger projecting from the rear of said tray and provided with an aperture for registering with the aperture in said strip whereby a securing element can be projected through these registering apertures.

2. The apparatus as described in claim 1, and further including a partition projecting forwardly from said plate, there being a plurality of spaced drainage openings arranged in the bottom wall of said tray.

3. In a feeding device, a feed-holding hopper adapted to be attached to a fence of an enclosure, said hopper being arranged exteriorly of the enclosure and including a back wall and side walls, said side walls terminating in a flange, the bottom edges of said side walls defining guide lips, a strip projecting rearwardly from the bottom of said back wall and provided with an aperture, a frame connected to the flanges of said hopper contiguous to the inner surface of said fence and detachably connected to said frame and flanges, there being an opening in the lower portion of said plate, and a tray having its upper end open for receiving feed from said hopper, said tray including side members provided with downturned fingers for slidably engaging the lips on said hopper, a portion of said tray projecting through the opening in said plate whereby animals can gain access to the feed therein, and a finger projecting from the rear of said tray and provided with an aperture for registering with the aperture in said strip whereby a securing element can be projected through these registering apertures.

References Cited in the file of this patent

UNITED STATES PATENTS

| | | |
|---|---|---|
| 581,608 | Neill | Apr. 27, 1897 |
| 837,390 | Easton et al. | Dec. 4, 1906 |
| 1,398,041 | Pfeifer | Nov. 22, 1921 |
| 1,602,000 | Custer | Oct. 5, 1926 |
| 1,633,880 | Ahlrichs | June 28, 1927 |
| 1,777,082 | Hale | Sept. 30, 1930 |
| 1,879,580 | Stoner | Sept. 27, 1932 |
| 2,532,726 | Lajoie et al. | Dec. 5, 1950 |